United States Patent
Tonelli et al.

(10) Patent No.: US 10,765,255 B2
(45) Date of Patent: Sep. 8, 2020

(54) JUG FOR BEVERAGES AND BEVERAGE PRODUCING MACHINE COMPRISING SAID JUG

(71) Applicant: KONINKLIJKE PHILIPS N.V., Eindhoven (NL)

(72) Inventors: Stefano Tonelli, Eindhoven (NL); Romeo Mattioli, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 520 days.

(21) Appl. No.: 14/777,884

(22) PCT Filed: Apr. 1, 2014

(86) PCT No.: PCT/IB2014/060351
§ 371 (c)(1),
(2) Date: Sep. 17, 2015

(87) PCT Pub. No.: WO2014/162262
PCT Pub. Date: Oct. 9, 2014

(65) Prior Publication Data
US 2016/0270589 A1    Sep. 22, 2016

(30) Foreign Application Priority Data
Apr. 2, 2013 (EP) .................................... 13162006

(51) Int. Cl.
*A47J 31/44*    (2006.01)
(52) U.S. Cl.
CPC ....... *A47J 31/4485* (2013.01); *A47J 31/4489* (2013.01)

(58) Field of Classification Search
CPC .... A47J 31/4489; A47J 31/4485; A47J 31/46; A47J 31/4403; A47J 31/461; A47J 31/3633; A47J 31/407; A47J 31/469; A47J 31/4475; A47J 31/4478; A47J 31/60
USPC ...... 99/280, 286, 287, 290, 293–295, 323.1, 99/323.3, 452, 453; 261/66, 72.1; 426/520
See application file for complete search history.

(56) References Cited

U.S. PATENT DOCUMENTS

| | | |
|---|---|---|
| 5,498,757 A | 3/1996 | Johnson |
| 2007/0243305 A1 | 10/2007 | Marconi |
| 2010/0107891 A1 | 5/2010 | Vanderstegen-Drake |
| 2011/0192287 A1 | 8/2011 | Riessbeck |
| 2011/1311694 | 12/2011 | Broennimann |
| 2012/0125202 A1* | 5/2012 | Remo ................. A47J 31/4485 99/286 |

(Continued)

FOREIGN PATENT DOCUMENTS

| | | |
|---|---|---|
| DE | 202009014114 U1 | 4/2010 |
| WO | 9100041 A1 | 1/1991 |

(Continued)

*Primary Examiner* — Ibrahime A Abraham
*Assistant Examiner* — Biniam B Asmelash

(57) ABSTRACT

The jug (11) comprises jug body (15) and a beverage frothing device (13) arranged on the jug. The beverage frothing device comprises a steam inlet (23, 25, 27), a beverage inlet (35, 35C), and a frothed beverage outlet (14). The frothing device is slidingly arranged in a seat (19) and is movable between a retracted position and an extended position. In the extended position the frothed beverage outlet (14) projects beyond a side wall of the jug body.

12 Claims, 10 Drawing Sheets

(56) References Cited

U.S. PATENT DOCUMENTS

| | | | |
|---|---|---|---|
| 2012/2222561 | | 9/2012 | Tonelli |
| 2012/0305111 A1 | | 12/2012 | Peretti |
| 2013/0239819 A1* | 9/2013 | Giua | ............... A47J 31/4489 |
| | | | 99/291 |
| 2014/0373735 A1* | 12/2014 | Bruinsma | ........... A47J 31/4489 |
| | | | 99/453 |

FOREIGN PATENT DOCUMENTS

| | | |
|---|---|---|
| WO | 2010044116 A2 | 4/2010 |
| WO | 2011015963 A2 | 2/2011 |
| WO | 2011064702 A1 | 6/2011 |

\* cited by examiner

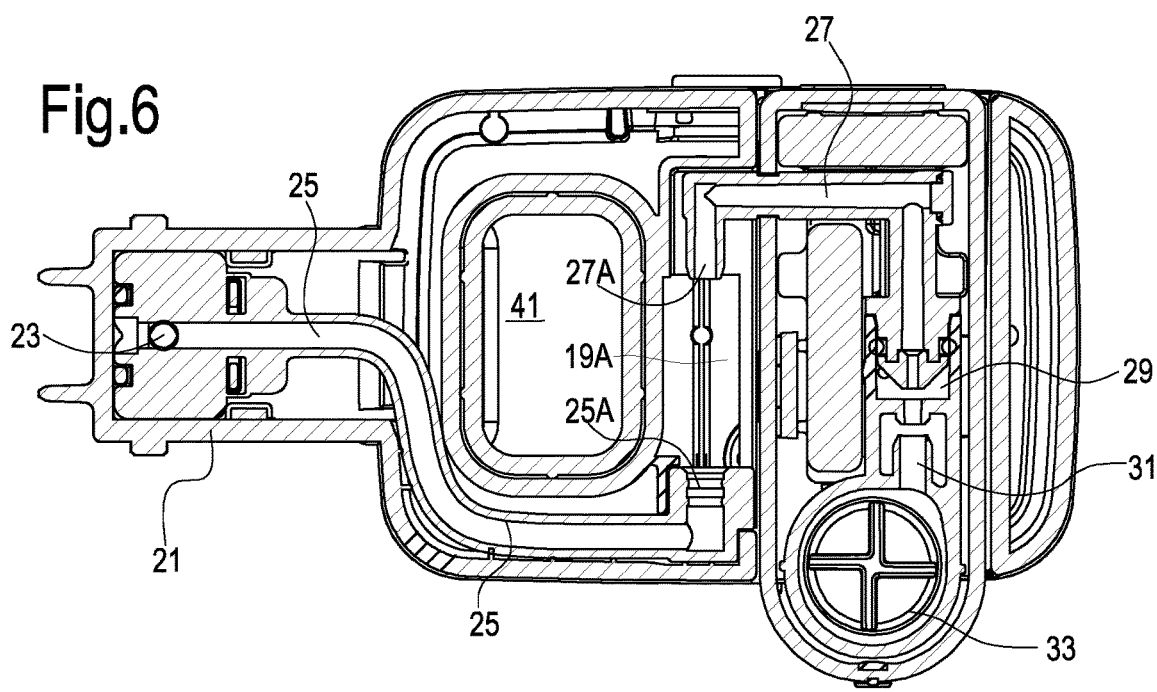
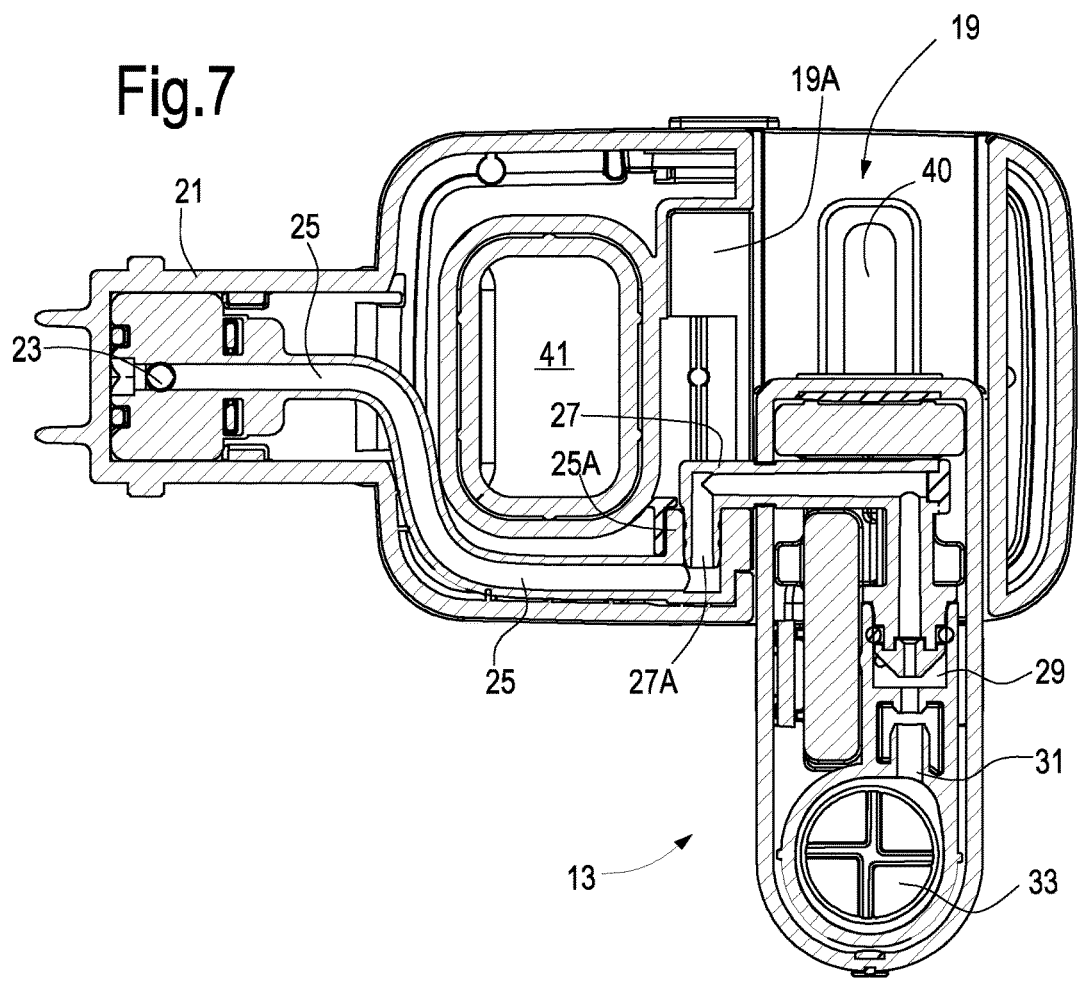

JUG FOR BEVERAGES AND BEVERAGE PRODUCING MACHINE COMPRISING SAID JUG

This application is the U.S. National Phase application under 35 U.S.C. § 371 of International Application No. PCT/IB2014/060351, filed on Apr. 1, 2014, which claims the benefit of European Application No. 13162006.4 filed on Apr. 2, 2013. These applications are hereby incorporated by reference herein.

TECHNICAL FIELD

The present invention relates to the field of household appliances, in particular to beverage-producing machines, such as coffee machines.

BACKGROUND ART

Modern coffee-producing machines are often provided with jugs for the preparation of frothed or hot milk. The jugs usually are provided with a frothing device, which is suitable for connection to a steam delivery nozzle provided on the beverage producing machine. Hot, pressurized steam is delivered through the frothing device in order to suck milk from the jug, heat and optionally froth the milk with air, for example for the production of cappuccino.

A coffee producing machine equipped with a jug having a frothing device is disclosed for example WO 2011/064702. The jug shall be designed so as to be easily recoverable in a refrigerator, preventing the milk contained therein from deteriorating.

Jugs and frother devices of the prior art are often rather complex and cumbersome.

SUMMARY OF THE INVENTION

The present invention provides a jug for beverages comprising a jug body and a beverage frothing device arranged on the jug. The frothing device comprises a steam inlet, a beverage inlet, and a frothed beverage outlet. The frothing device is movable. Advantageously the movable frothing device is slidingly arranged in a seat and is movable between a retracted position and an extended position. In the extended position the frothed beverage outlet projects beyond a side wall of the jug body.

In practical embodiments, the movable frothing device slides with a translation movement in a seat provided on the jug. The jug and the frothing device can thus be manufactured in a simple manner, with a rather small number of pieces, resulting in a relatively inexpensive and reliable jug. By moving the frothing device in the retracted position, the footprint of the jug is reduced. This makes recovery of the jug in a refrigerator easier. By extending the frothing device in the extended or extracted position, the frothed beverage outlet can be positioned above a cup placed e.g. under a coffee dispensing nozzle of a coffee maker, to which the jug is connected.

The jug is usually utilized for frothing or heating milk, e.g. in combination with a coffee or espresso maker. The jug can however be used also for heating and/or frothing other frothable beverages.

In preferred embodiments, the jug comprises a jug cover, arranged for closing the jug body. The seat housing the movable frothing device is advantageously formed in the jug cover. Manufacturing and use of the jug becomes thus simpler and more user friendly.

In preferred embodiments, in the retracted position the frothing device is arranged substantially within the footprint of the jug cover. This results in a particularly space-saving jug. By "substantially within the footprint" a position is understood wherein at least ⅔ and preferably at least ¾ of the length of the frothing device are within the footprint of the jug. In some embodiments the frothing device in the retracted position can be entirely contained within the footprint of the jug.

In some embodiments the jug cover can comprise a steam inlet port for connection with a steam dispensing nozzle of a beverage producing machine. A steam flow path can also be provided in the jug cover, extending from the steam inlet port towards the frothing device.

In some embodiments, the steam flow path comprises a stationary steam duct and a movable steam duct. The former is stationary with respect to the jug cover and the latter is movable together with the movable frothing device. Between the stationary steam duct and the movable steam duct a connection is provided. The two steam ducts can be selectively connected to one another when the frothing device is in the extended position, and disconnected from one another when the frothing device is in the retracted position. The movable frothing device can thus be easily removed from the jug cover, e.g for cleaning purposes. In some embodiments, a stationary, first connector and a movable, second connector are provided for establishing a connection between the movable steam duct and the stationary steam duct, respectively. In some embodiments, the stationary connector can be provided with a steam outlet aperture or port which is oriented downwardly, i.e. towards the bottom of the jug. If steam is delivered to the jug while the movable beverage frothing device is still in the retracted position, e.g. because the user inadvertently forgot to displace it in the extended position, thus leaving the connectors distanced from one another, steam escapes the stationary steam duct downwardly. An inner volume can be provided, e.g. in the jug cover, where the steam can expand and cool. The jug cover can be provided with a venting port, where through the spent steam can be discharged.

According to some embodiments the jug cover can comprise a projection extending from a front side of the jug cover. The steam inlet port can be arranged on the projection. In some embodiments, the frothing device and the seat thereof can be arranged so that in the extended position the frothed beverage outlet projects from a lateral side of the jug cover. The projection bearing the steam inlet port makes the connection between the jug and a steam delivery nozzle on the beverage producing machine easier. By arranging the steam inlet port and the frothed beverage outlet on two substantially orthogonal sides of the jug, a particularly ergonomic arrangement is obtained. The jug can be connected to a steam delivery nozzle provided on a front panel of the beverage producing machine, whereon also a beverage delivery nozzle, e.g. a coffee delivery nozzle is arranged.

The jug cover can comprise a slot, extending along the seat where the movable frothing device is slidingly arranged. The slot extends preferably parallel to the direction of movement of the frothing device in the seat. The beverage inlet of the frothing device is connected to a beverage suction pipe extending through the slot towards bottom of the jug. With this arrangement the suction pipe can freely move together with the movable frothing device, avoiding the need for bending the pipe when sliding the movable frothing device from the retracted position to the extended position or vice-versa.

In some embodiments the jug cover can be provided with a through aperture for pouring a beverage in the jug body without requiring the jug cover to be removed. The through aperture is preferably provided with a removable lid.

In some embodiments the jug can have a rectangular footprint, with the steam inlet port arranged on a front side and the frothing device projecting from a lateral side.

The frothing device can be configured in any manner known to those skilled in the art. In some embodiments the frothing device can include a Venturi tube. A frothing chamber can also be provided. An air inlet pathway is further provided, in order to supply air in the device and produce the required froth. The air inlet pathway can be in communication with the environment, or with an air supply arrangement provided in the beverage producing machine to which the jug is connectable. In some embodiments the frothing device can comprise adjustment means to adjust the amount of froth and/or to close the air inlet pathway so that hot, unfrothed beverage can be produced if required. When the air inlet pathway is open, air is sucked in the frothing device and mixed with the beverage to produce a frothed beverage.

The frothing device can be provided with a single heating and frothing chamber, where steam, beverage and air are mixed in a single step. In other embodiments, the frothing device can comprise a frothing chamber, where the beverage sucked from the jug and air are mixed to form a froth. A further mixing chamber is arranged downwards the frothing chamber, where the cold frothed beverage is mixed with the steam flow. In this mixing chamber steam is condensed and the frothed beverage is heated.

According to a further aspect, the invention also concerns a beverage producing machine comprising a steam nozzle and a jug according to any one of the preceding claims. The beverage producing machine can be for example a coffee maker or an espresso maker. The beverage producing machine can comprise at least a beverage dispensing nozzle. The steam nozzle and the beverage dispensing nozzle can be arranged such that when the jug is connected to the steam nozzle and the frothing device is in the extended position, the frothed beverage outlet is located adjacent the beverage dispensing nozzle, so that a beverage dispensed from the beverage dispensing nozzle and the frothed beverage dispensed from the frothed beverage outlet of the frothing device can be dispensed in a single beverage receiving container positioned under the beverage dispensing nozzle and the frothed beverage outlet.

Further features and advantages of the invention are set forth in the following description of exemplary embodiments thereof and in the enclosed claims, which form an integral part of the present description.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings:

FIG. 6 illustrates a cross section along line VI-VI in FIG. 5, with the movable frothing device in the retracted position;

FIG. 7 illustrates the same cross section of FIG. 6, with the movable frothing device in the retracted position;

DESCRIPTION OF EMBODIMENTS OF THE INVENTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Here below reference will specifically be made to a milk jug and a milk frothing device. However, the invention can be used also in other jugs and for the preparation of different frothable beverages.

Figure 1:
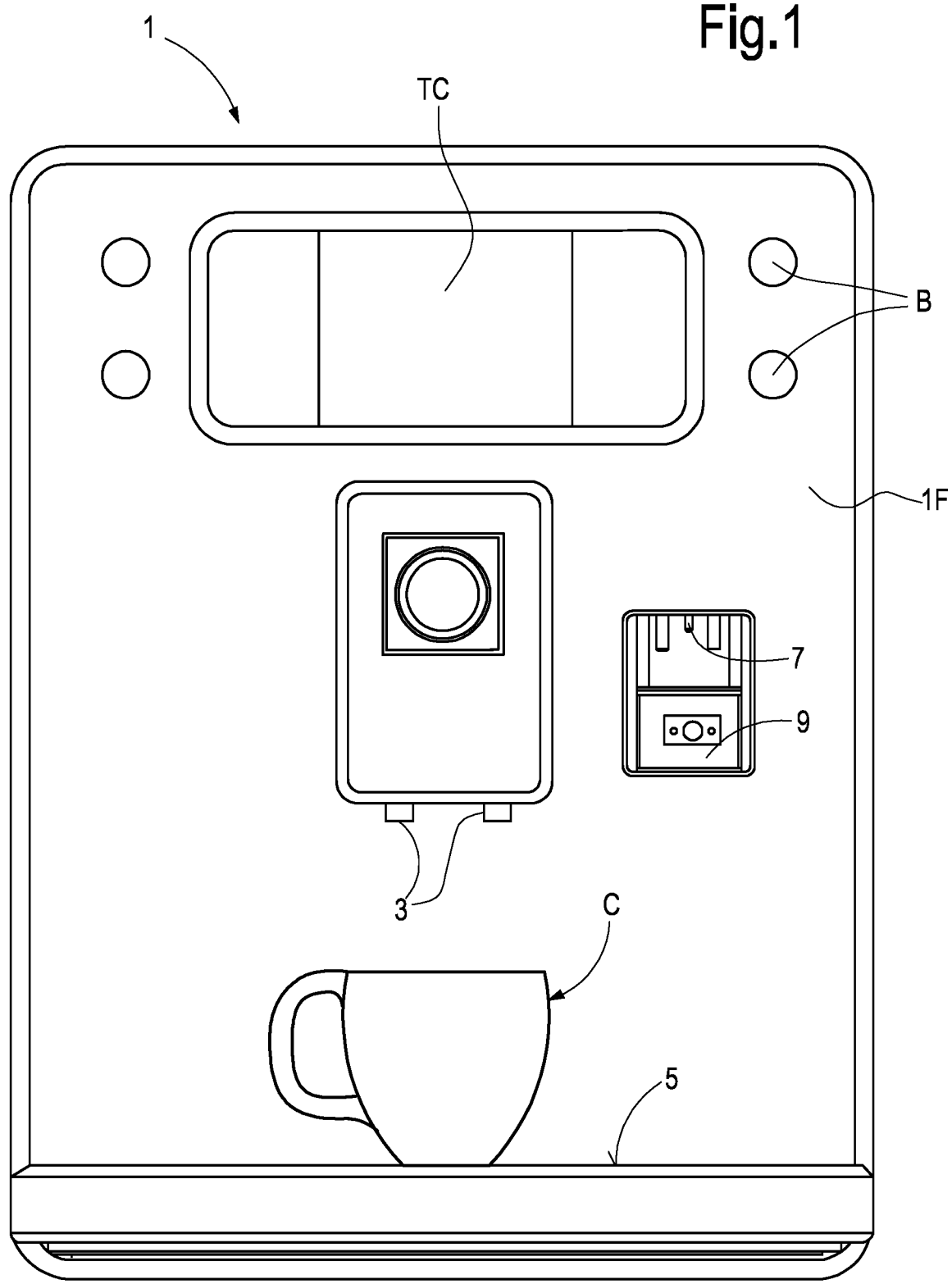
FIGS. 1 and 2 schematically illustrate a coffee machine with a milk jug connected thereto (FIG. 2) and with the milk jug removed (FIG. 1)
Figure 2:
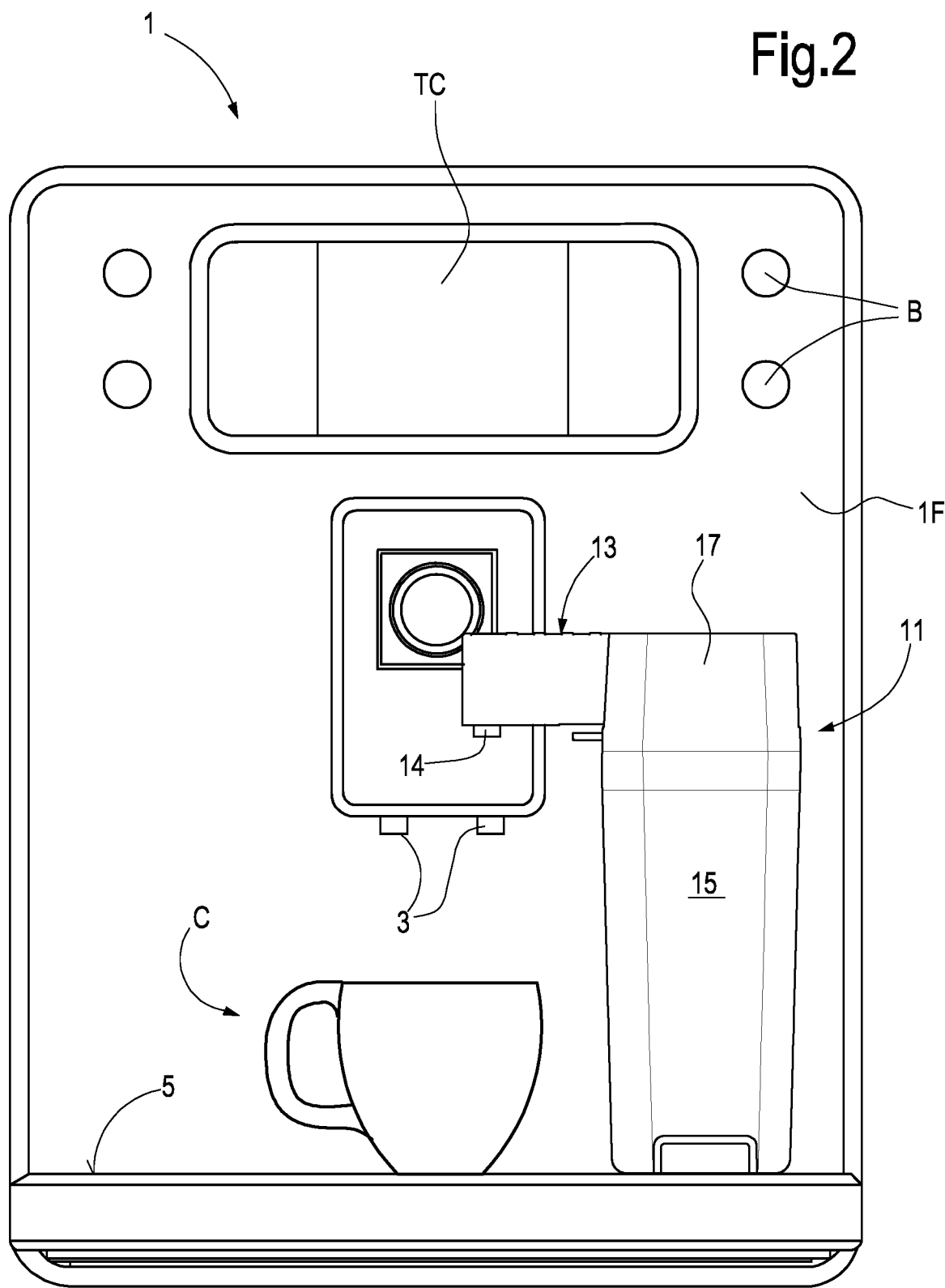

FIGS. 1 and 2 illustrate a coffee-producing machine, for example an espresso producing machine. The machine is designated 1 as a whole and is provided with a front panel 1F, on which coffee dispensing nozzles 3 are provided. The coffee dispensing nozzles 3 are arranged above a grid 5 designed for receiving a cup or other beverage collecting container C.

On the front panel 1F of the coffee producing machine 1 a steam nozzle 7 is also provided. In some embodiments the steam nozzle 7 can be housed in a recess 9 on the front panel 1F of the coffee machine 1 and is preferably oriented towards the surface 5. The arrangement of the steam nozzle 7 can be as described in WO 2011/064702.

In FIG. 2 the coffee machine 1 is shown in combination with a milk jug 11 connected thereto. The milk jug 11 has a steam inlet which is designed for connection with the steam nozzle 7 as will be disclosed in more detail later on. The milk jug 11 is designed so that milk delivered from the milk jug 11 can be poured directly into a cup C placed under the coffee dispensing nozzles 3 preferably without displacing the cup C from the coffee collecting position as shown in FIGS. 1 and 2.

For that purpose the milk jug is provided with a movable beverage frothing device 13, here below also named milk frothing device, which can be at least partly extracted from the milk jug 11 to take up the extended position shown in FIG. 2. In the extended position a frothed milk outlet 14 is located above the cup C, projecting beyond the side wall of the jug.

Constructional details and functional features of the jug 11 will now be described in more detail with reference to the following FIGS. 3 to 8.

In some embodiments the jug 11 comprises a jug body 15 and a jug cover 17.

Figure 3:
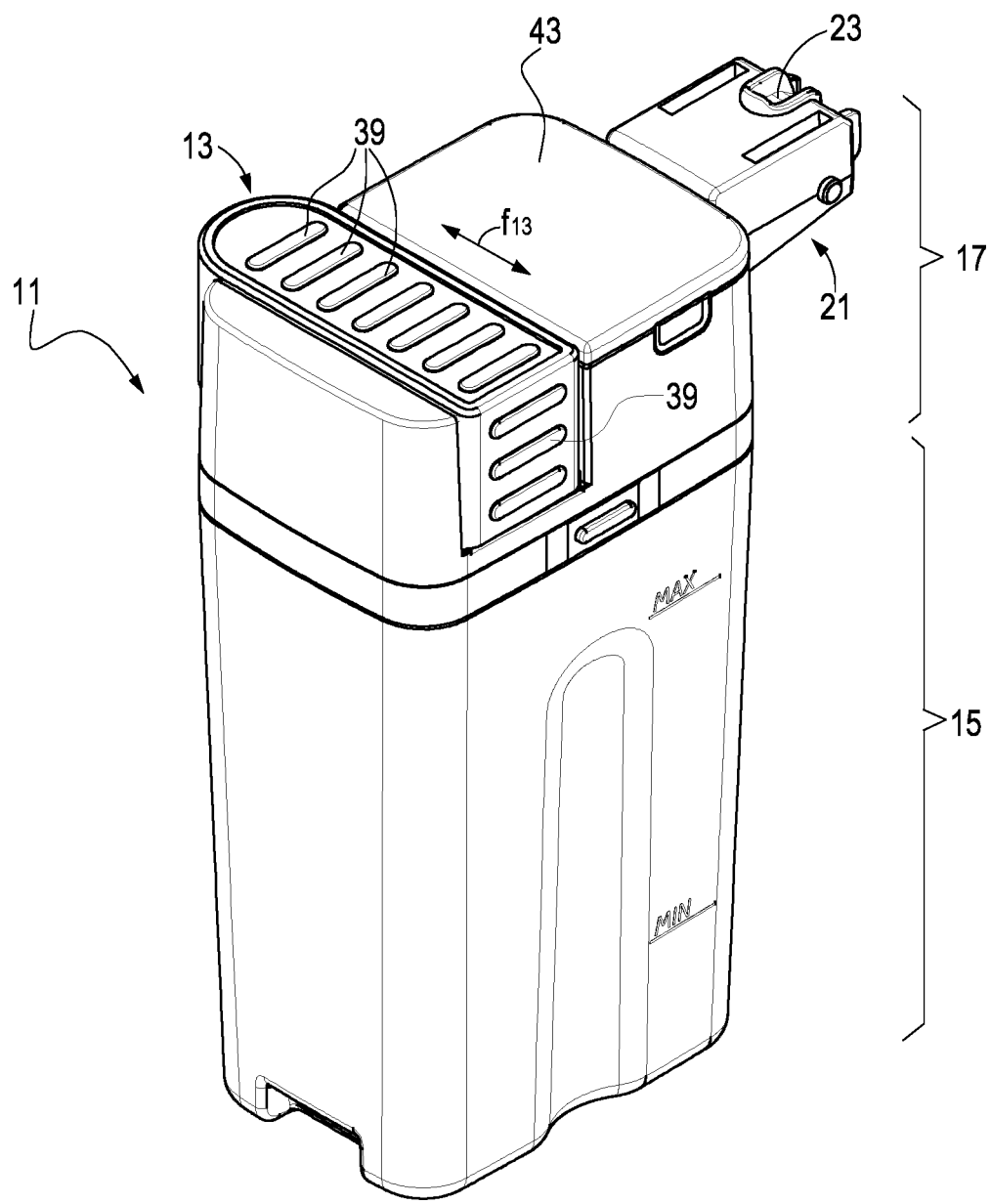
FIG. 3 illustrates an axonometric view of the jug with the movable frothing device in the retracted position, according to a first embodiment.
Figure 4:
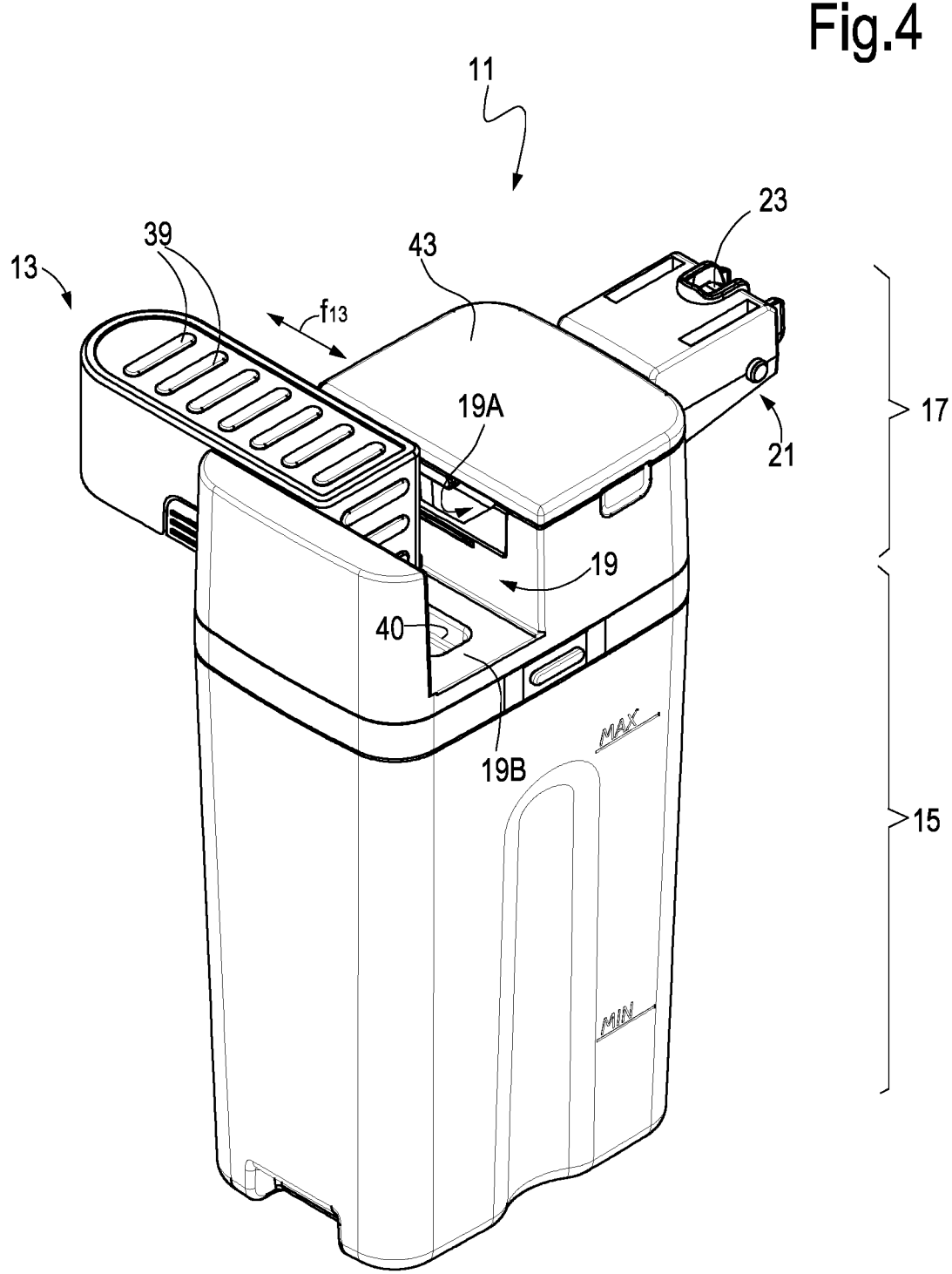
FIG. 4 illustrates an axonometric view of the jug with the movable frothing device in the extended position.
Figure 5:
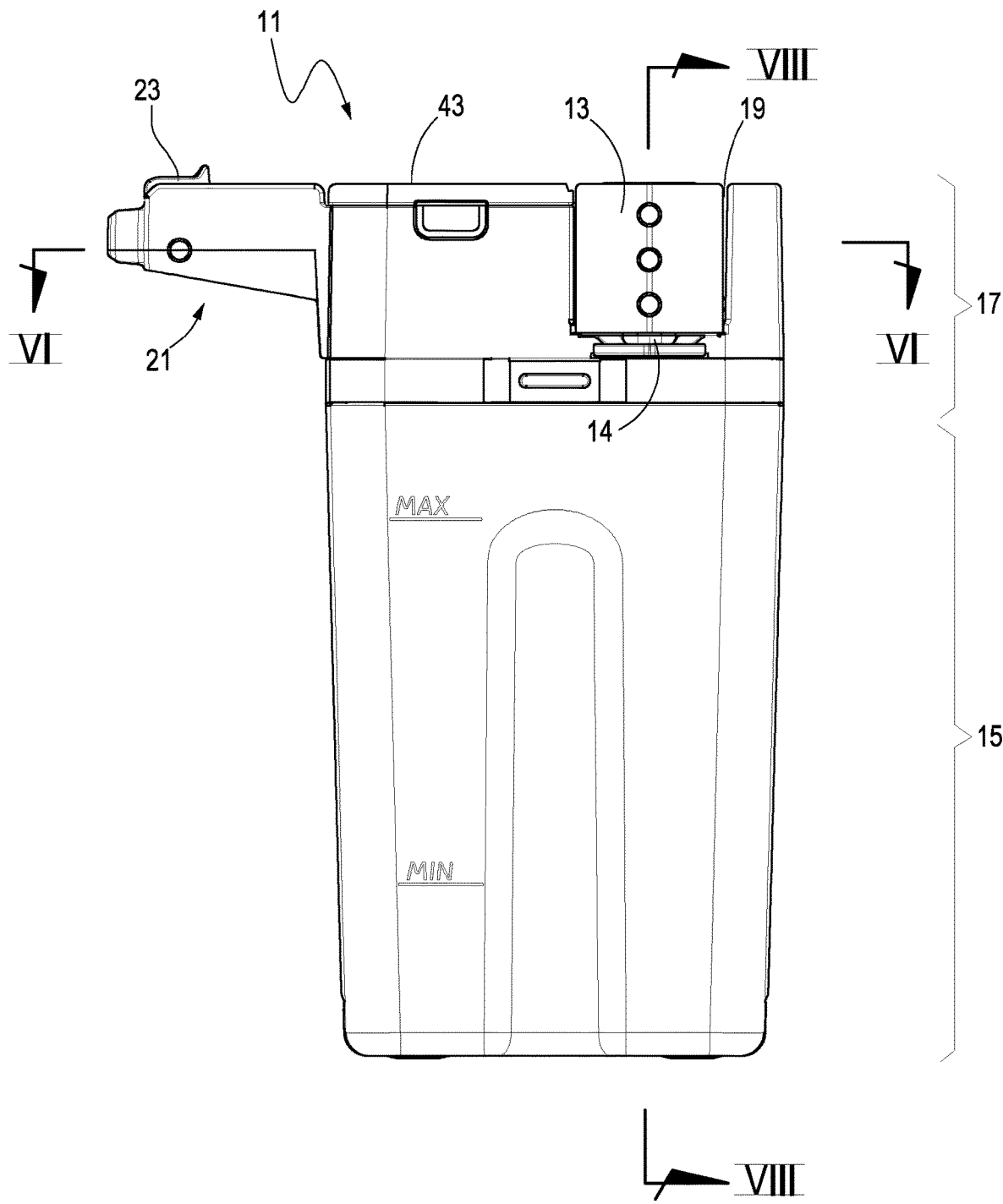
FIG. 5 illustrates a side view of the jug.

The movable milk frothing device 13 can be advantageously housed in a seat or recess 19 provided in the jug cover 17 and can be moved between a retracted position and an extended position. FIGS. 3 and 4 illustrate the jug 11 in one embodiment, with the milk frothing device 13 in a retracted position and in an extended position, respectively. Double arrow f13 indicates the reciprocating translation sliding movement of the movable milk frothing device 13.

In some embodiments the seat 19 extends transversely across the width of the jug 11, which can have a broadly rectangular footprint. The movable milk frothing device 13 can thus be brought in an extended position, see FIG. 4, wherein the frothing device projects sideways from the jug 11, beyond the sidewall thereof.

The jug 11 can be provided with a nose or projection 21 where a steam inlet port 23 is located. In some embodiments the steam inlet port 23 is facing upwardly and is designed for connection to the steam nozzle 7 which is correspondingly oriented downwardly (FIG. 1). Other arrangements are of course possible, for example a horizontally oriented port for connection with horizontally oriented steam delivery nozzle 7, or intermediate arrangements.

The projection 21 extends from a front side of the jug 11, preferably approximately orthogonal to the longitudinal dimension of seat 19, wherein the movable frothing device 13 is housed.

As best shown in FIGS. 6 and 7, a stationary steam duct 25 can be provided, which extends from the steam inlet port 23 towards a first connector 25A arranged near the seat 19 of the movable frothing device 13. The movable frothing device 13 can be provided with a movable steam duct 27, which extends from a movable connector 27A towards a milk frothing chamber 29 arranged inside the movable frothing device 13. The movable connector 27A and the movable steam duct 27 move together with the movable frothing device 13, when the latter is displaced from the retracted position to the extended position, or vice versa. When the movable frothing device is in the extended position (FIG. 7) the stationary connector 25A and the movable connector 27A are connected to one another so that the stationary steam duct 25 and the movable steam duct 27 form a continuous steam path extending from the steam inlet port 23 to the milk frothing chamber 29. When the milk frothing device 13 is in the retracted position (FIG. 6), the steam path can be interrupted, the movable connector 27A being distanced from the stationary connector 25A.

The seat 19 can advantageously be provided with a side aperture 19A which extends parallel to the direction of movement f13 of the movable frothing device 13. The movable steam duct 27 projects from the main body of the movable frothing device 13 and extends through the side aperture 19A (FIG. 4), the longitudinal dimension whereof is sufficient to allow the movable steam duct 27 to move together with the movable frothing device 13 when the latter is displaced from the retracted position (FIGS. 3 and 6) to the extended position (FIGS. 4 and 7) and vice versa.

The milk frothing chamber 29 is in turn in communication with a milk dispensing port 31 ending in a cyclone chamber 33, opened at the bottom and forming the frothed milk outlet 14.

The operation of the frothing device 13 is known per se and will not be described in greater detail herein. It is sufficient to note that the steam coming from the coffee machine 1 at high pressure and high temperature flows through the frothing chamber 29 and generates a suction by Venturi effect to suck milk through a milk inlet formed by a milk inlet pathway 35 (see FIG. 8), thus sucking milk from the body 15 of the jug 11. Air is also sucked from the surrounding environment. Mixing milk, steam and air together causes the steam to condensate thus heating the milk, while mixing the milk with air generates a milk froth. As known in the art, the three fluids can be mixed simultaneously in a single operating step. In other embodiments, air and milk can be pre-mixed, producing frothed milk. The latter and then be heated by mixing with the hot steam.

Figure 8:
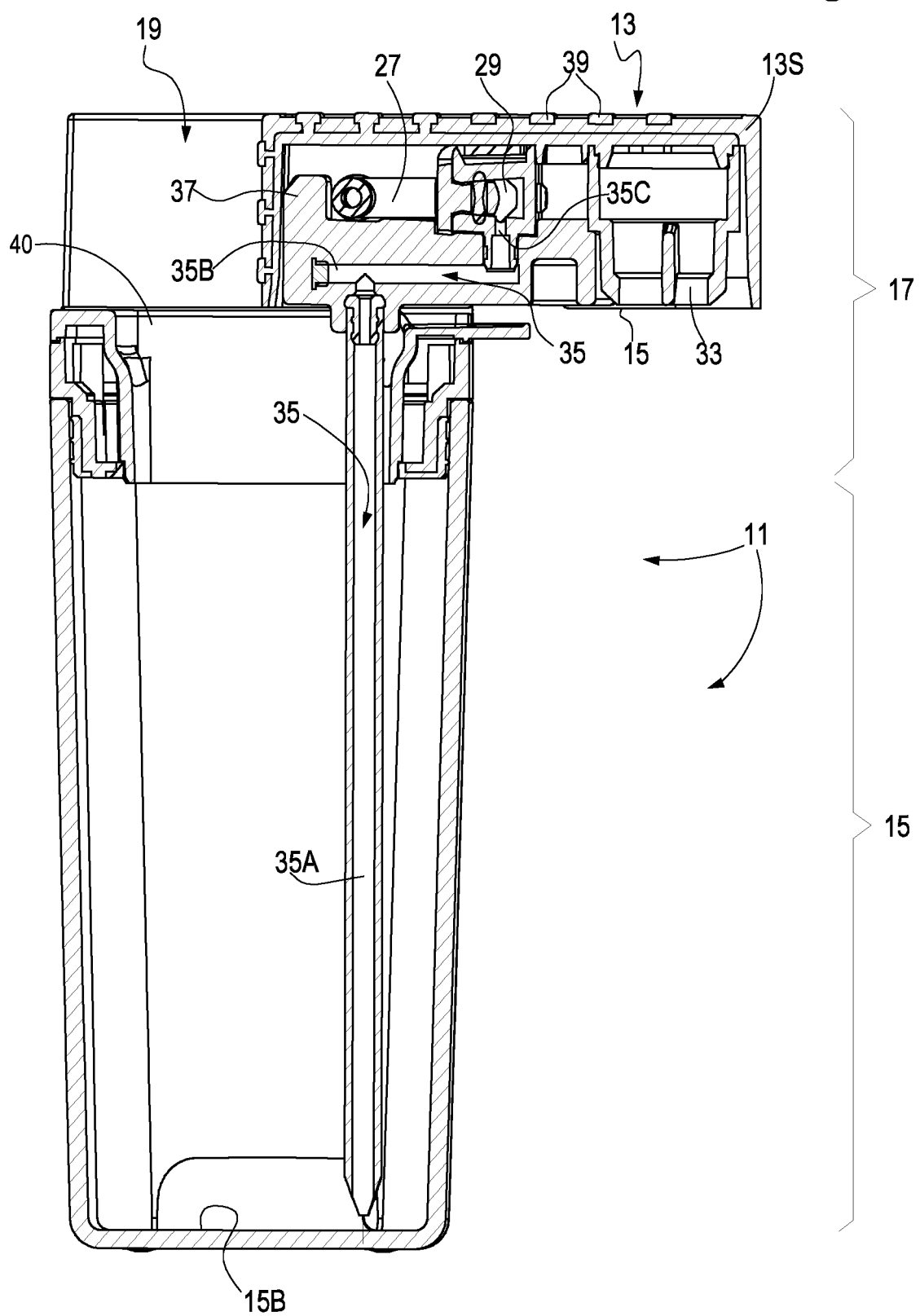
FIG. 8 illustrates a cross section along line VIII-VIII of FIG. 5.
Figure 9:
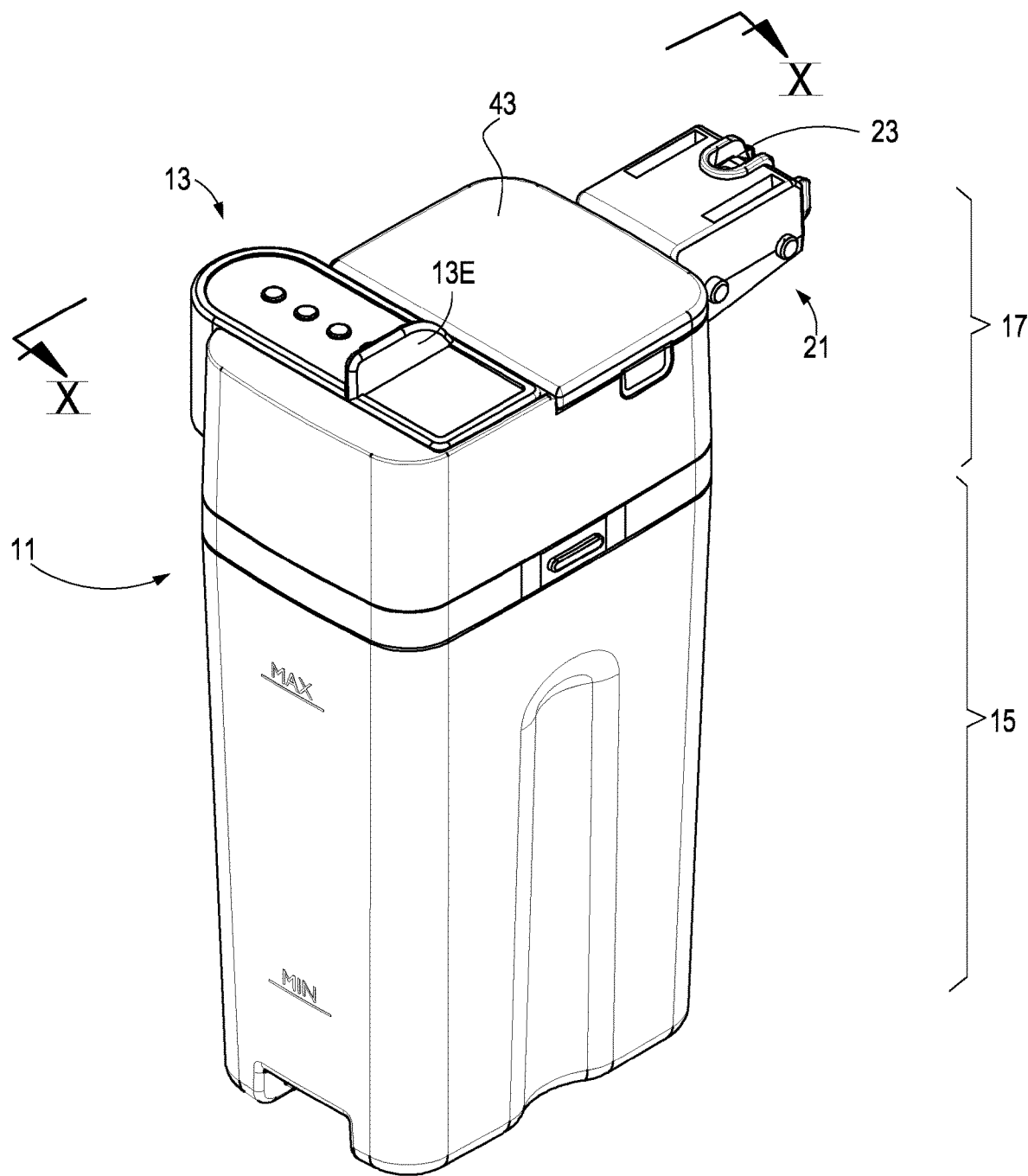
FIG. 9 illustrates an axonometric view of the jug with the movable frothing device in the retracted position, in a second embodiment.
Figure 10:
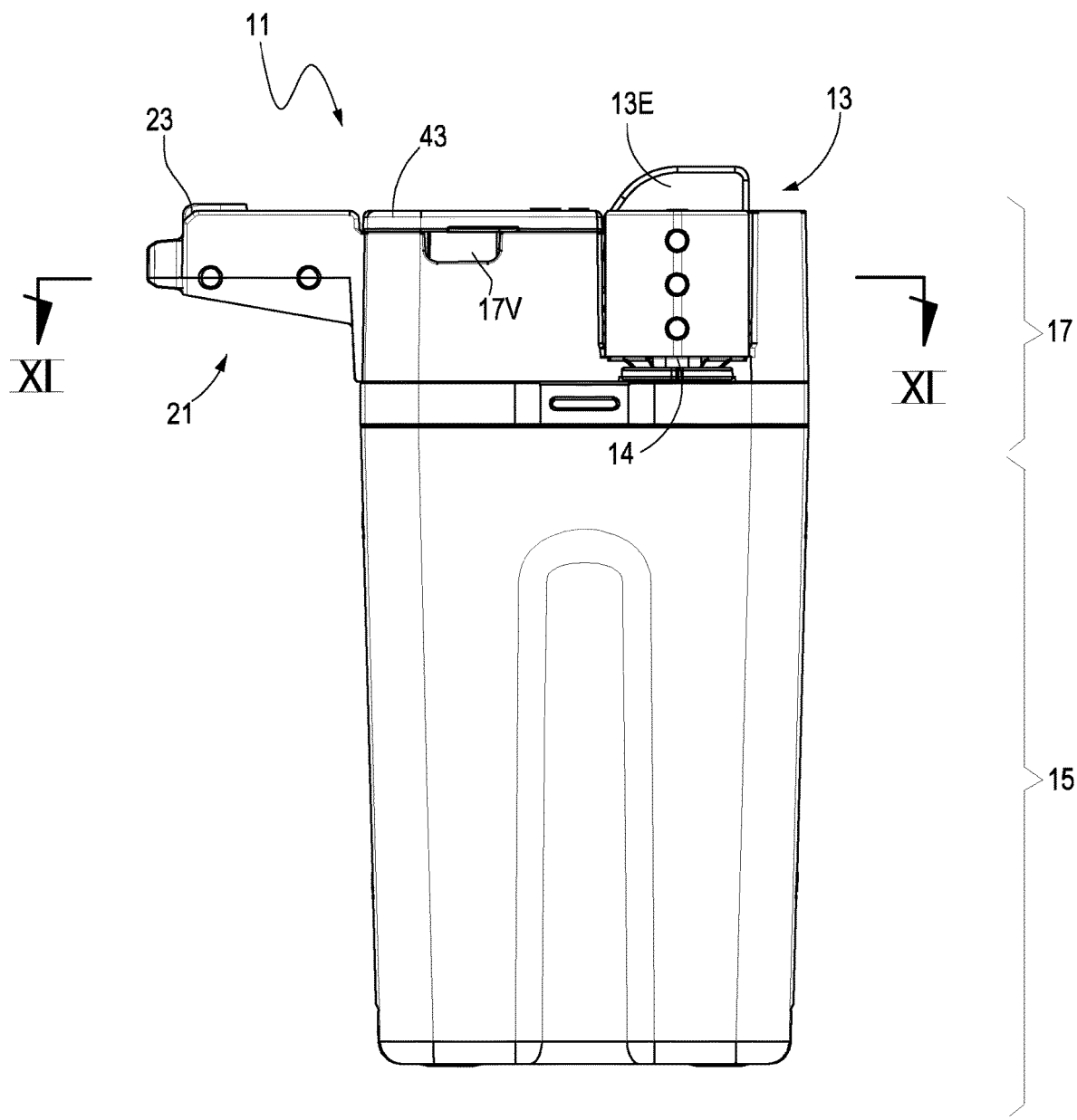
FIG. 10 illustrates a side view of the jug of FIG. 9.

As can be best seen in FIG. 8, the milk inlet pathway 35 can comprise a milk suction pipe 35A extending from the movable frothing device 13 downwards towards the bottom 15B of the jug body 15. The proximal end of the pipe 35A is connected to a component 37 forming the inner portion of the movable frothing device 13. A milk passage 35B formed in the component 37 is in fluid communication with pipe 35A and forms part of the milk inlet pathway 35, which ends with an inlet aperture 35C in the milk frothing device chamber 29.

In some embodiments the bottom wall 19B of the seat 19 is provided with an elongated slot 40, which extends parallel to the direction of movement f13 of the movable frothing device 13. The milk suction pipe 35A extends in this way through the elongated slot 40 towards the bottom of the jug body 15.

In some embodiments the seat 19, where the movable frothing device 13 is slidingly, housed is open at the top and has substantially a U-shaped cross section. In this manner the movable frothing device 13 is accessible by the user from the top of the milk jug 11. In some embodiments at least a portion of the outer surface of the movable frothing device 13 can be provided with a surface texture forming a sort of gripping surface 39. The texture or a relief pattern can be provided for example on the outer surface of a shell 13F which can surround the inner components of the movable frothing device 13.

In some embodiments the jug cover 17 can be removed to get access to the interior of the jug body 15 and pour fresh milk therein.

In other embodiments, the cover 17 can be provided with a through aperture 41, see in particular FIGS. 6 and 7. In some embodiments the through aperture 41 can be closed by means of a lid 43. In this case, pouring the milk in the jug body 15 is possible by simply removing the lid 43 and making the through aperture 41 accessible for the user, without the need for removing the jug cover 17 from the jug body 15. Poring fresh milk in the jug body 15 becomes thus possible, for example, also when the jug 19 is connected to the coffee machine 1, as shown in FIG. 2.

In some embodiments, see FIGS. 6 and 7, the stationary steam duct 25 extends around the through aperture 41 which can be arranged for example between the projection 21, where the steam inlet port 23 is provided, and the seat 19 housing the movable milk frothing device 13.

The operation of the jug 11 and the machine 1 described so far is the following. When the production of a milk-containing beverage is requested, e.g. cappuccino or latte macchiato, the milk jug 11 can be at least partly filled with fresh milk and connected to the machine 1 by introducing the steam nozzle 7 into the steam inlet port 23. The movable frothing device 13 is then moved in the extended position as shown in FIGS. 2, 4 and 7.

The machine 1 can be an automatically controlled machine, for example, and the user can simply enter instructions, for example through push bottoms or touch buttons B or a touch screen TC on the front panel of the machine 1. The machine then performs a brewing cycle, dispensing coffee in the cup C through the coffee dispensing nozzles 3. By delivering hot pressurized steam through the steam nozzle 7 into the steam pathway 25, 27, hot and frothed milk will also be produced and dispensed through the frothed milk outlet 14 directly into the cup C.

The coffee brewing step and the milk frothing step can be performed simultaneously or sequentially. In the second case, milk can be dispensed first and coffee afterwards, or preferably vice versa. Once the preparation of milk-containing beverages has ended, the movable frothing device 13 can be moved in the retracted position (FIGS. 3 and 6) and the milk jug 11 can be removed and stored in a refrigerator, for example.

The machine 1 can also be operated to produce simple hot frothed milk, with no coffee, or else to produce hot, unfrothed milk, in which case air suction in the frothing device would be prevented, e.g. by shutting an air suction port (not shown). In some embodiments, the amount steam flow rate and/or the steam temperature as well as the air flow rate can be adjustable, either manually or electronically, to select the desired beverage characteristics.

While an automatic machine operation is usually provided in this kind of beverage-producing devices, simpler embodiments can envisage a partially or totally manual operation.

The various components of the milk jug 11, including the components forming the movable frothing device 13, can be disassembled for easy cleaning, for example in a dishwater.

FIGS. 9 to 12 illustrate a modified embodiment of a jug according to the invention. The same reference numbers indicate the same or equivalent elements and components shown in FIGS. 1 to 8. These will not be described again.

In this embodiment one end of the seat 19 is closed. To improve the grip on the movable milk frothing device 13 and ease the displacement thereof along the seat 19, a grip extension 13E can be provided.

Figure 11:
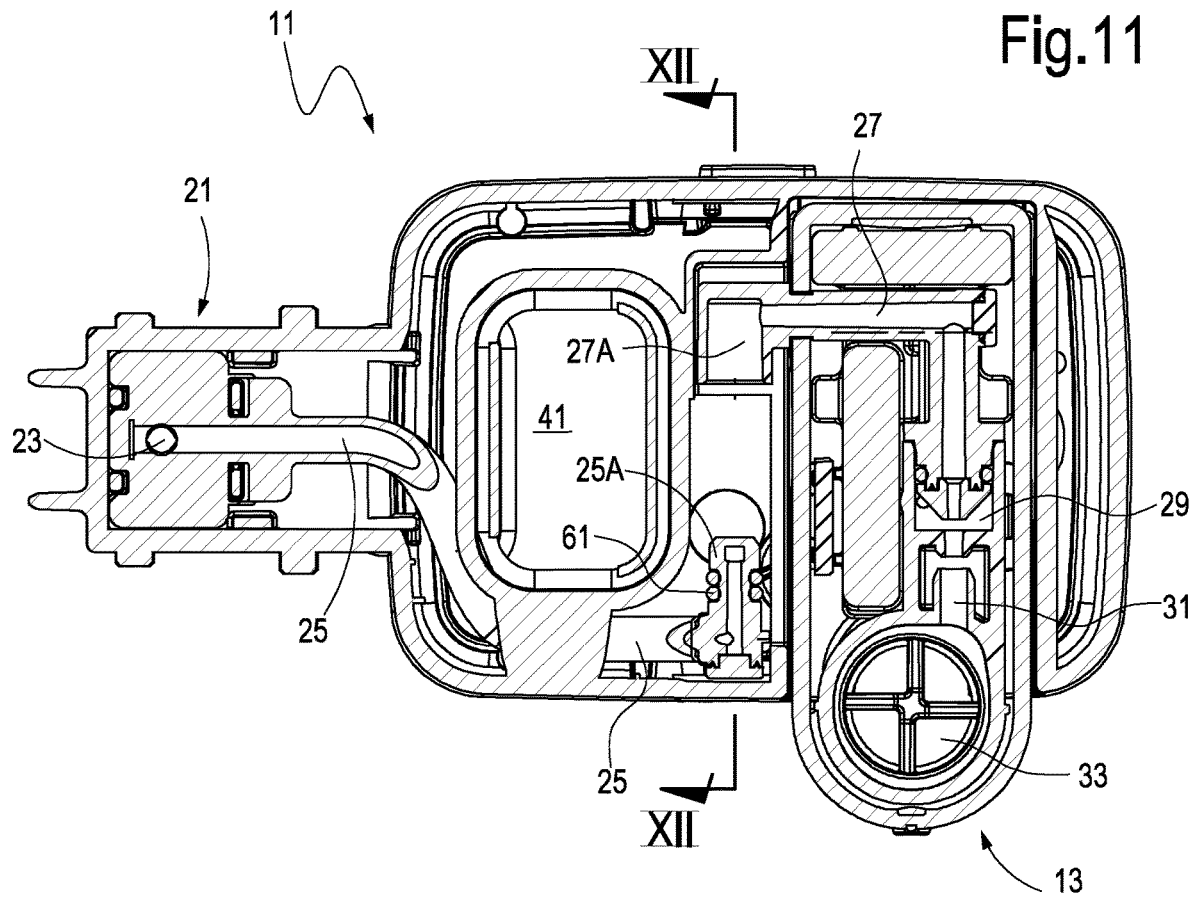
FIG. 11 illustrates a cross-section according to line XI-XI of FIG. 10.
Figure 12:
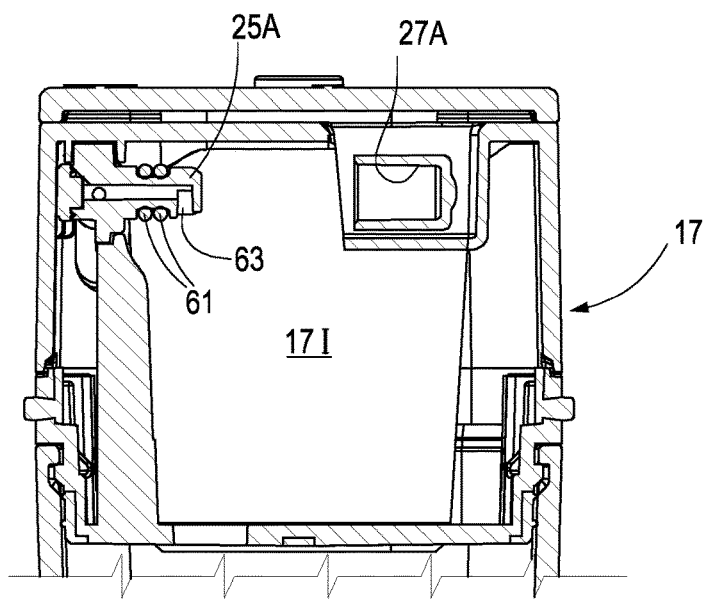
FIG. 12 illustrates a cross-section according to lien XII-XII in FIG. 11.

As best shown in FIGS. 11 and 12, in this embodiment the first connector 25A is provided with a sealing gasket 61 and with steam outlet port 63 facing downwardly, i.e. towards the bottom 15B of the jug body 15. In the cross-sections of FIGS. 11 and 12 the movable milk jug 13 is in the retracted position and the two connectors 25A, 27A are disengaged. If the user accidentally starts a frothing cycle with the milk frothing device in this retracted position, the steam will be discharged inside the jug cover 17. The latter is provided with a steam venting aperture 17V (see FIG. 10), wherefrom the steam can escape, after expansion and cooling in the interior 17I of the jug cover 17. Thus, escaping steam will not be harmful for the user and at the same time will not (or only partly) accumulate in the form of condensate in the jug.

When the movable milk frothing device 13 is moved in extended position, the two 25A, 27A will engage with one another and the sealing gasket 61 will prevent the steam from escaping.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A jug for beverages comprising a jug body, a jug cover and a beverage frothing device arranged on the jug, said beverage frothing device comprising a steam inlet, a beverage inlet, and a frothed beverage outlet, wherein the frothing device is slidingly arranged in a seat and is movable between a retracted position and an extended position, and wherein in the extended position the frothed beverage outlet projects beyond a side wall of the jug body
   wherein the jug cover comprises a steam inlet port and a steam flow path extending from the steam inlet port towards the frothing device; and
   wherein the steam flow path comprises
      a stationary steam duct, which is stationary with respect to the jug cover, and a movable steam duct which is movable together with the movable beverage frothing device;
   wherein between the stationary steam duct and the movable steam duct a connection is provided; and
   wherein the stationary steam duct and the movable steam duct can be selectively connected to one another when the frothing device is in the extended position, and disconnected from one another when the frothing device is in the retracted position.

2. The jug according to claim 1, wherein the jug cover is arranged for closing the jug body, and wherein the seat is formed in the jug cover.

3. The jug according to claim 2, wherein in the retracted position the frothing device is arranged substantially within the footprint of the jug cover.

4. The jug according to claim 1, wherein the stationary steam duct is provided with a stationary connector and the movable steam duct is provided with a movable connector; wherein the stationary connector and the movable connector engage one with the other when the movable 3 beverage frothing device is in the extended position; and
   wherein the jug cover is provided with a steam venting aperture.

5. The jug according to claim 1, wherein the jug cover comprises a projection extending from a front side of the jug cover, the steam inlet port being arranged on said projection; and wherein the frothing device and the seat thereof are arranged so that in the extended position the frothed beverage outlet projects from a lateral side of the jug cover.

6. The jug cover according to claim 5, wherein the lateral side and the front side are orthogonal to one another.

7. The jug according to claim 2, wherein the jug cover comprises a slot, extending along the seat in a direction of movement of the frothing device in the seat, and wherein the beverage inlet of the frothing device is connected to a beverage suction pipe extending through the slot towards a bottom of the jug.

8. The jug according to claim 2, wherein the seat is in the form of an upwardly open channel extending across a width of the jug cover, the frothing device being accessible from a top of the jug cover.

9. The jug according to claim 2, wherein the jug cover has a through aperture for pouring a beverage in the jug body without removing the jug cover.

10. The jug according to claim 9, wherein the through aperture is arranged between the seat and the steam inlet port.

11. The jug according to claim 2, wherein the frothing device is removable from the jug cover when said frothing device is in the retracted position.

12. The jug according to claim 1, wherein the frothing device moves in said seat in a direction substantially parallel to a bottom of the jug body.

\* \* \* \* \*